(No Model.) 2 Sheets—Sheet 1.

D. ROGERS.
SELF HEATING AND SEPARATING STILL.

No. 284,331. Patented Sept. 4, 1883.

WITNESSES.
J. H. Burridge.
D. P. Peery

INVENTOR.
Davenport Rogers
W. H. Burridge
BY
ATTORNEY.

(No Model.) 2 Sheets—Sheet 2.
D. ROGERS.
SELF HEATING AND SEPARATING STILL.
No. 284,331. Patented Sept. 4, 1883.
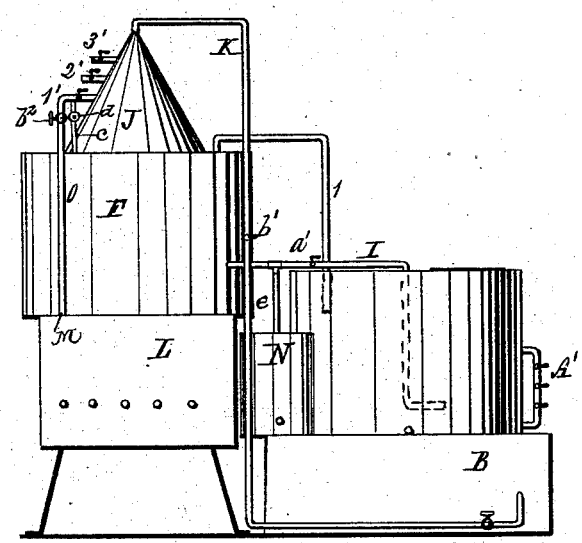
FIG. 3.
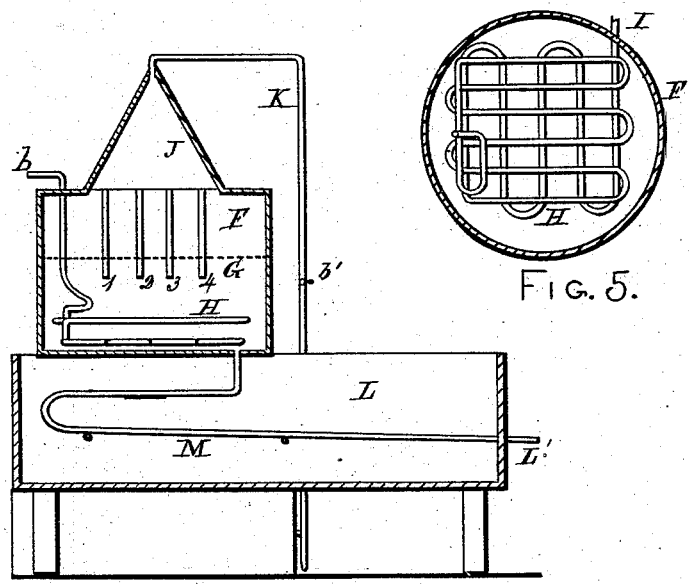
FIG. 5.
FIG. 4.
WITNESSES.
J H Burridge
E J Beecher
BY
INVENTOR.
Davenport Rogers
W H Burridge
ATTORNEY.

UNITED STATES PATENT OFFICE.

DAVENPORT ROGERS, OF GALION, OHIO.

SELF HEATING AND SEPARATING STILL.

SPECIFICATION forming part of Letters Patent No. 284,831, dated September 4, 1883.

Application filed July 11, 1882. (No model.)

*To all whom it may concern:*

Be it known that I, DAVENPORT ROGERS, of Galion, in the county of Crawford and State of Ohio, have invented certain new and useful improvements in distilling crude petroleum-oils for illuminating purposes, of which the following is a full, clear, and exact description, reference being had to the accompanying drawings, forming part hereof.

My invention has for its object the economical distillation of petroleum-oils for illuminating purposes; and the invention consists in subjecting the cold crude oil to heat in a heater, passing it thence to a still, upon the bottom of which it is spread shallow, returning the vapors from the still to the heater, separating such vapors into various grades or specific gravities by condensation in said heater, and utilizing the incondensable gases as fuel for the still-fire, substantially in the manner and by the means hereinafter specified and claimed.

Figure 1:
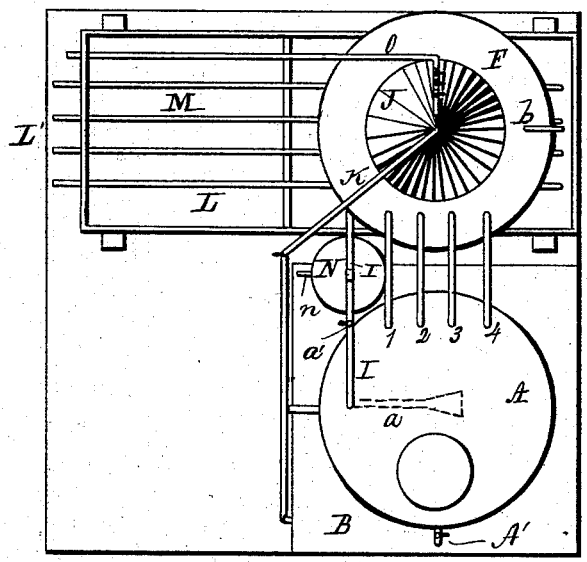
Figure 2:
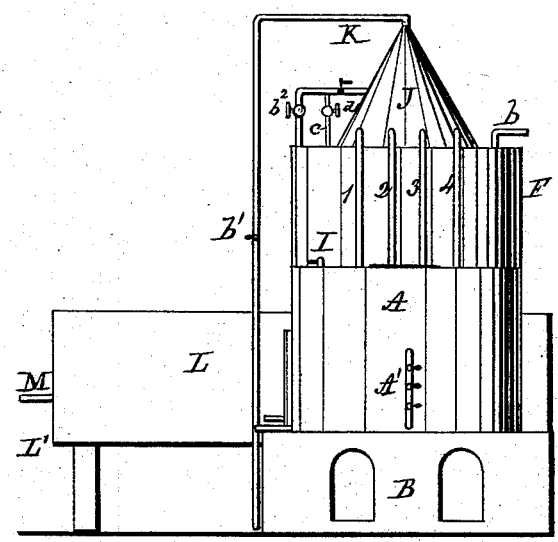

In the drawings referred to, in the several figures of which like parts are similarly designated, Figure 1 is a top plan view of my apparatus. Fig. 2 is a front elevation, looking up from the bottom of Fig. 1. Fig. 3 is a side elevation, looking from left to right of Fig. 1. Fig. 4 is a vertical section of the heater and condenser, and Fig. 5 is a cross-section of the heater just below the dotted-line diaphragm of Fig. 4.

The letter A represents an ordinary flat-bottomed still, and B the furnace therefor.

F is a heater and separator combined, provided with a conical dome, J.

$b$ is a pipe extending from a reservoir containing the crude material in an unheated state and arranged within the separator as a coil or series of crossing coils of pipes, H, and thence leading, as pipe I, to the still A, near the bottom of which it terminates in a fan-shaped or flaring nozzle, $a$. (See dotted lines, Fig. 1.)

The separator F is further in communication with the still by means of a series of pipes, 1, 2, 3, and 4, which said pipes terminate in the separator between a diaphragm, G, and the coil H. (See Fig. 4.) The diaphragm G is of reticulated or otherwise foraminous material.

The pipe I has a branch pipe, $e$, leading to a cylindrical tank, which I shall designate a "trap," because of its function, hereinafter explained; and said pipe I also has a cock, $a'$. The still has a series of pet gage-cocks, A'.

L represents the condenser, it being a tank supporting a series of pipes, M, leading from the bottom of the separator F, extending through said condenser and having external ends, L', leading to receiving-tanks.

From the sides of the dome J extend a series of pipes, 1' 2' 3', each having a stop-cock, $b^2$, and a return branch, $c$, in which latter is also arranged a stop cock or valve, $d$. These pipes 1' 2' 3' are continued at $o$ into and through the condenser to receiving-tanks. I have shown only one such cock $b^2$, branch $c$, cock $d$, and pipe $o$; but the arrangement is the same for each of the pipes 1' 2' 3'.

From the top of the dome extends a pipe, K, provided with a blow-off cock, $b'$, Fig. 3, located as shown or elsewhere, and this said pipe passes thence to the still-furnace directly or indirectly, as desired or necessary.

The operation is as follows: Crude petroleum, from an elevated reservoir or tank, is conducted through pipe $b$ into the coil H, wherein it is heated by the vapors coming in from the still through the pipes 1 2 3 4. The vapors serve to heat the oil in the coil, so that the still is supplied with oil preheated, whereby distillation is expedited, and reciprocally the cold of the incoming oil in the separator is sufficient to aid in the condensation of the vapors coming in from the still. The oil passes on through the coil H, out of the pipe I into the still through the nozzle $a$, and is spread by said nozzle over the bottom of the still in a shallow body, and this shallow body of oil is kept in agitation by the constant inflow of oil, so as to prevent burning on the still-bottom. The oil is kept at a uniformly shallow depth, observable by the cocks A', and I prefer a depth of from eight to ten inches. The distilling with a shallow body of oil enables me to evaporate all the oil below the heat that causes destructive distillation, and I find that I raise vapors more readily and with much less heat in this way. In starting up, the oil passes from the coil into pipe I, and will flow first through the pipe $e$ into the tank N, and as said tank fills the overflow will pass on into the still. The heavier parts of the oil, water, and residuum will sink to the bottom of this tank or be trapped thereby and displace the lighter oil, which will pass on to the still, the residuum, &c., being drawn off the trap by a cock, n. The vapors from the still pass by pipes 1, 2, 3, and 4 into the separator F, and their heavier portions are precipitated by the cold of the pipes H, incident to the continuous flow therethrough of the incoming crude material, and, dropping on the bottom of the separator, flow along with the heavy incondensed vapors, down the pipes M, through the condenser L, where they are wholly condensed and passed to the receiving-tanks as oil. The lighter vapors, rising, come in contact with the reticulated diaphragm G, and, screened and measurably precipitated thereby, pass on into the dome. So much of these vapors as will rise no farther than the height of the pipe 1' find an outlet there, and are either run by pipe o through the condenser and condensed, or else are returned through the branch pipe c to the separator F for further separation. The next lighter vapors escape at pipe 4' and are similarly treated, and the still lighter vapors are similarly disposed of at pipe 3', while the dry incondensable gases escape through pipe K into the still-fire, to serve as fuel under suitable regulations, the surplus not required for fuel being allowed to escape into the atmosphere through the cock b'. The supply of oil to the still is regulated by the cock a' in the pipe I.

Now, my apparatus can be run indefinitely, for the supply of oil to the still can be made constant and continuous so long as the still is evaporating it and the vapors carried off and condensed, thus avoiding the loss of time incident to stopping for cleaning out the still.

I separate the vapors direct from the still at the same time and in a constant flow into different grades and specific gravities, as desired, at the same time eliminating the volatile and incondensable gases, and utilizing them as fuel for the still. The products of this sort of distillation are of different specific gravity and fire-test.

The advantages possessed by my process herein described over the ordinary processes of manufacture to me known are as follows: First, I distill four times as fast; second, eliminate vapors enough to run the fires without the use of coal or other fuel; third, obtain a greater yield by about thirty per cent. from the crude material; fourth, produce an oil of much lighter gravity and color; and, fifth, carrying on the distillation below the heat that causes destructive distillation also gives me a better illuminator and of greater safety in use.

What I claim is—

1. An apparatus for distilling petroleum, consisting of a heater, a coil of pipe arranged within said heater and connected with the source of supply of the petroleum to be distilled, a still, a pipe leading from the coil into the still, to supply petroleum to said still and maintain a shallow body of oil in said still, a trap between the heater and still, to eliminate the water from the petroleum before the petroleum enters the still, pipes leading from the still back into the heater, to convey the vapors from the still to the heater, wherein such vapors serve to preheat the petroleum in the coil, graded eduction-pipes for separating the vapors in the heater and taking off such vapors according to their gravity, and a pipe leading from the heater to the still-furnace, to enable the utilization of the incondensable gases as fuel, all combined and arranged to operate substantially as shown and described, whereby cold crude material is preheated by the vapors coming from the still, and such vapors separated according to the gravity and a continuous and constant distillation kept up.

2. The combination and arrangement, substantially as shown and described, of the induction-coil H, the heater F, the still A, into which said coil opens through the spreader a, the return-pipes 1 2 3 4, the separating-dome J and its eduction-pipes, the condenser, the still-furnace, and the pipe K, for conveying the incondensable gases from the separator to the furnace for use as fuel.

3. The combination and arrangement, substantially as shown and described, of a furnace, B, a still, A, a trap, N, pipe I, connected with said trap, coil H, with which the pipe I is united, inlet b, for said coil, vessel F, in which the coil is arranged, pipes 1 2 3 4, connecting said vessel and still, dome J, surmounting vessel F, graded eduction-pipes from said dome, and a condenser.

4. The combination and arrangement, substantially as shown and described, of a furnace, B, a still, A, a trap, N, pipe I, connected with said trap, coil H, with which the pipe I is united, inlet b, for said coil, vessel F, in which the coil is arranged, pipes 1 2 3 4, opening in the heater below a foraminous diaphragm, G, therein, and connecting said vessel and still, dome J, surmounting vessel F, graded eduction-pipes from said dome, and a condenser.

In testimony whereof I affix my signature in presence of two witnesses.

DAVENPORT ROGERS.

Witnesses:
R. W. JOHNSTON,
F. S. WISTEMAN.